US008901759B2

(12) United States Patent
Pirisi

(10) Patent No.: US 8,901,759 B2
(45) Date of Patent: Dec. 2, 2014

(54) SYSTEM FOR CONVERTING POTENTIAL OR KINETIC ENERGY OF A BODY WEIGHING UPON OR TRAVELLING OVER A SUPPORT OR TRANSIT PLANE INTO USEFUL ENERGY

(75) Inventor: Andrea Pirisi, Bassano Bresciano (IT)

(73) Assignee: Underground Power S.R.L., Pinzolo (TN) (IT)

( * ) Notice: Subject to any disclaimer, the term of this patent is extended or adjusted under 35 U.S.C. 154(b) by 285 days.

(21) Appl. No.: 13/503,313

(22) PCT Filed: Oct. 20, 2010

(86) PCT No.: PCT/IB2010/002697
§ 371 (c)(1),
(2), (4) Date: Jun. 21, 2012

(87) PCT Pub. No.: WO2011/048478
PCT Pub. Date: Apr. 28, 2011

(65) Prior Publication Data
US 2012/0248788 A1    Oct. 4, 2012

(30) Foreign Application Priority Data
Oct. 22, 2009 (IT) .............................. MI09A001834

(51) Int. Cl.
*F03G 3/00* (2006.01)
*F03G 7/08* (2006.01)
*H02K 7/18* (2006.01)

(52) U.S. Cl.
CPC ............... *F03G 7/08* (2013.01); *H02K 7/1876* (2013.01)
USPC ...................................................... 290/1 R

(58) Field of Classification Search
CPC ...... F03G 7/08; H02K 7/1853; H02K 7/1892; H02K 35/02
USPC ...................................................... 290/1 R
See application file for complete search history.

(56) References Cited

U.S. PATENT DOCUMENTS

| 7,102,244 | B2 * | 9/2006 | Hunter, Jr. ................... 290/1 R |
| 7,429,145 | B2 * | 9/2008 | Rastegar et al. ............... 404/71 |
| 7,589,428 | B2 * | 9/2009 | Ghassemi ..................... 290/1 R |
| 8,123,431 | B2 * | 2/2012 | Chen .............................. 404/71 |
| 2006/0218892 | A1 * | 10/2006 | Calvert ........................ 60/268 |
| 2007/0257495 | A1 |  11/2007 | Kim et al. |

OTHER PUBLICATIONS

International Search Report Apr. 4, 2012.

* cited by examiner

*Primary Examiner* — Tho D Ta
(74) *Attorney, Agent, or Firm* — Hedman & Costigan, P.C.; James V. Costigan; Kathleen A. Costigan

(57) ABSTRACT

The present invention refers to a system (1) for converting potential and/or kinetic energy of a body weighing upon and/or travelling over a support and/or transit plane into useful energy that comprises: a fixed framework (2) with which at least one footboard (3) is associated in a mobile manner, through the action of said body, between an initial position and an end position, a magnetic interaction device (4), which in turn comprises at least two elements (42, 43) that are associated with one another in a mobile manner relative to one another and the mobile one of which (43) is associated with at least one magnet (40), means for counteracting the relative motion of said two elements (42, 43) and at least one activation magnet (41) of said mobile element (43) in motion with respect to the other fixed element (42), in which said magnetic interaction device takes up a first configuration in which said activation magnet (41) is outside of the field of interaction with the magnet (40) of said mobile element (43) and a second configuration in which said activation magnet (41) is inside the field of interaction with the magnet (40) of said mobile element (43), and means for transmitting the motion of the footboard (3) between said initial and end positions to one from said activation magnet (41) and the combination of said two elements (42, 43) for the passage of said magnetic interaction device (4) from said first configuration to said second configuration, and/or vice-versa, setting said mobile element (43) in motion with respect to the fixed element (42) without any contact, in which the relative motion of said two elements (42, 43) makes useful energy available in the form of variation of a magnetic flux or of pressure of a fluid.

18 Claims, 10 Drawing Sheets

Figure 1:
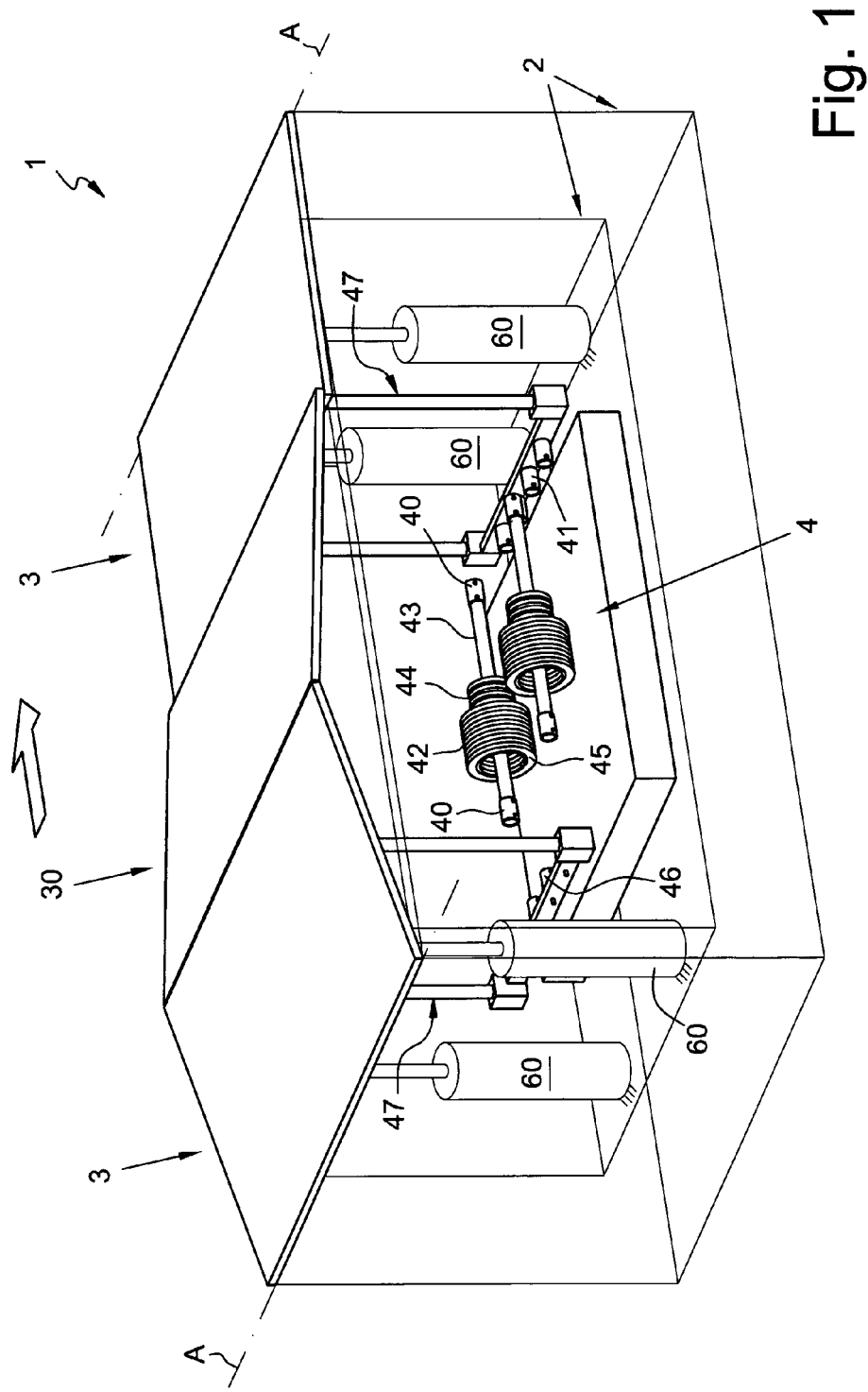

SYSTEM FOR CONVERTING POTENTIAL OR KINETIC ENERGY OF A BODY WEIGHING UPON OR TRAVELLING OVER A SUPPORT OR TRANSIT PLANE INTO USEFUL ENERGY

The present invention refers to a system for converting potential and/or kinetic energy of a body weighing upon and/or travelling over a support and/or transit plane into useful energy.

In particular, the present invention refers to a system for converting the potential and/or kinetic energy associated with a vehicle or load, for example a container, which is loaded onto the support plane of a weighbridge or with a vehicle or pedestrian travelling over a road or pedestrian surface into useful energy, particularly electrical energy.

In the state of the art devices for generating electrical energy that exploit the kinetic energy associated with the travel of vehicles along a road surface are known, which, in general, comprise a framework fixed to the road surface and one or more footboards that are associated in a mobile manner with such a framework. The motion of such footboards, generated by a vehicle travelling over them, is transmitted to the mobile component of an electrical induction generator, in general consisting of a rotary electric machine, by means of a kinematic chain consisting of a series of mechanical elements suitably coupled together, such as cylindrical articulated joints, junctions, gears and flywheels. Such a kinematic chain, as well as having a disadvantageously complex structure that requires frequent and burdensome maintenance interventions, involves inevitable energy dissipation.

The Applicant has set itself the problem of how to improve such a state of the art to convert the mechanical energy associated with the motion of mobile footboards, which is generated by the movement or passing over them of a body, in particular a vehicle or a pedestrian, into useful energy, in particular electrical energy, with a simpler structure and with a greater overall efficiency.

In particular, the Applicant has set itself the problem of achieving such a conversion without the need for a mechanical transmission system between the footboard and the mobile part of an electrical induction generator.

The Applicant has made a system for converting potential and/or kinetic energy of a body weighing upon and/or travelling over a support and/or transit plane into useful energy, in which the motion of a footboard generated by the movement or passing over it of a body, in particular a vehicle or a pedestrian, is transmitted to a component of a magnetic interaction device that converts such motion into a variation of magnetic flux used, in particular, to generate electrical current. These purposes according to the present invention are accomplished by making a system for converting potential and/or kinetic energy of a body weighing upon and/or travelling over a support and/or transit plane into useful energy as outlined in claim 1.

Further characteristics are foreseen in the dependent claims.

Figure 2:
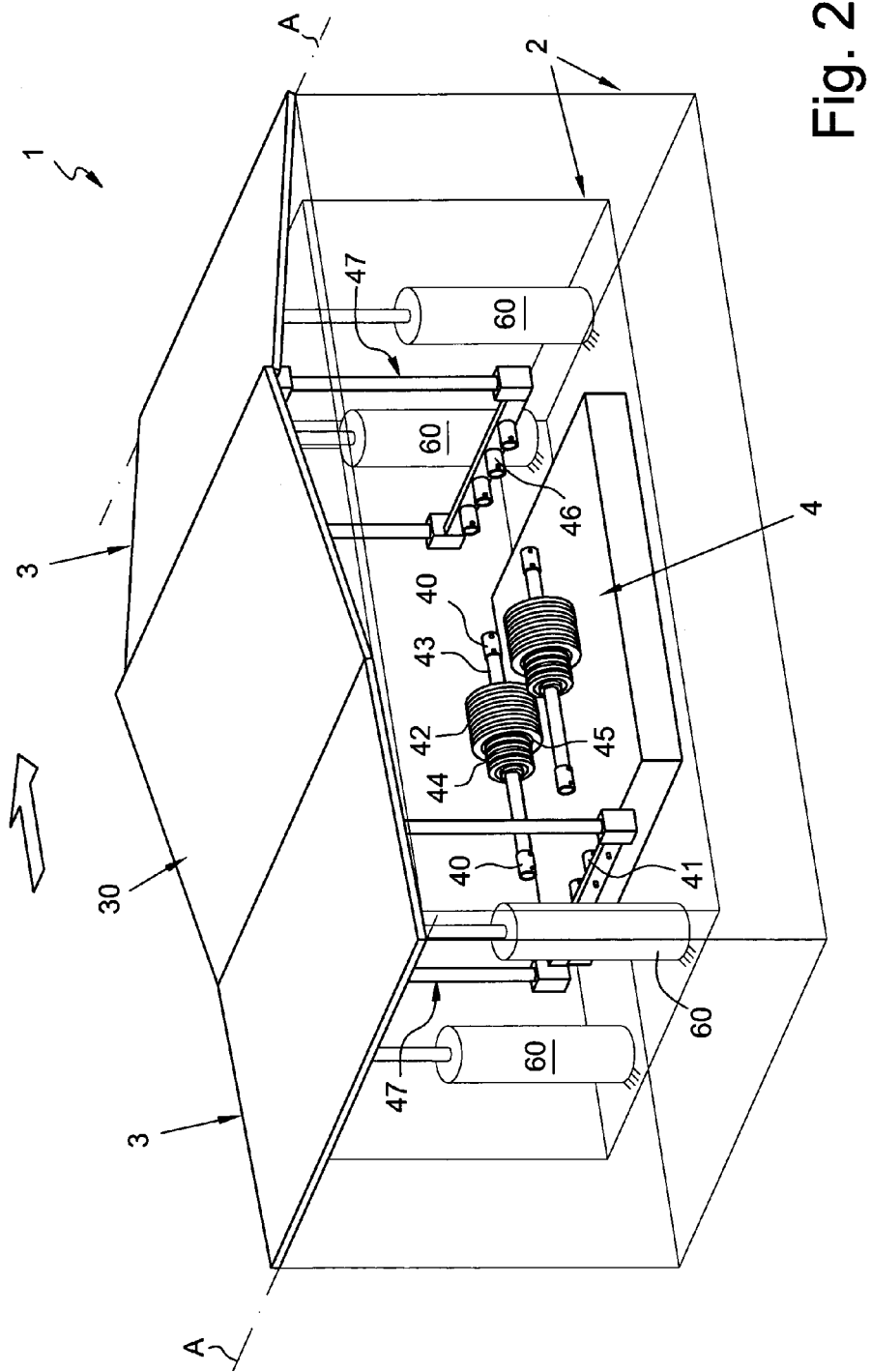
Figure 3:
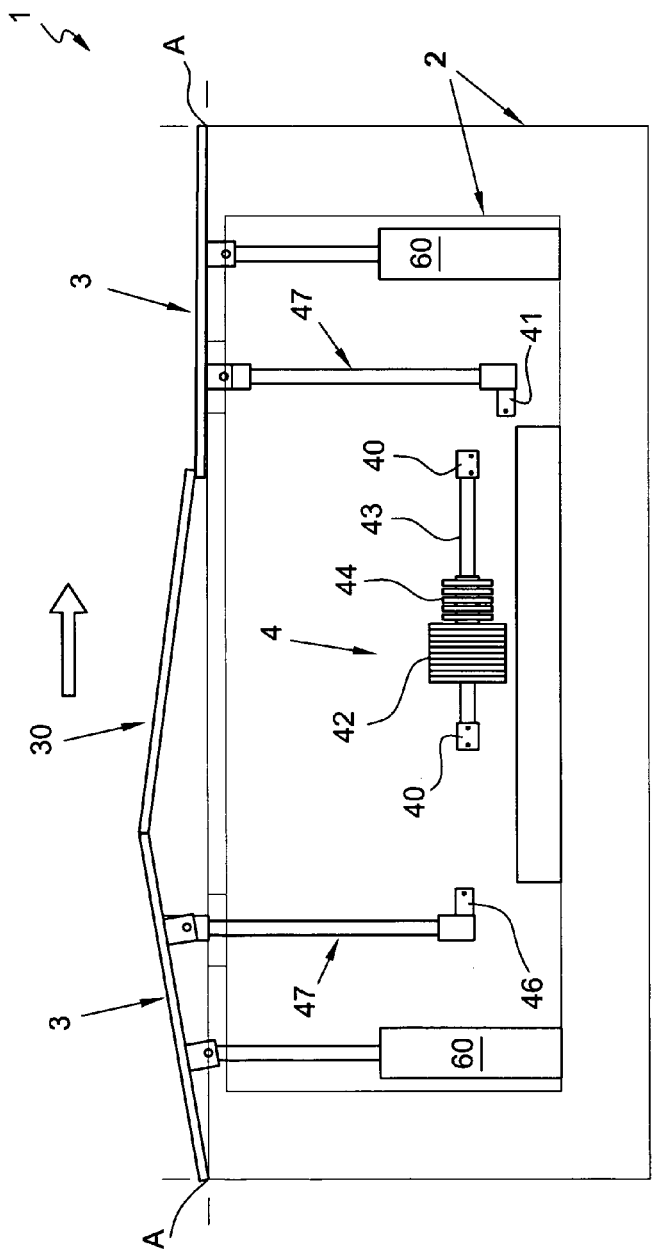
Figure 4:
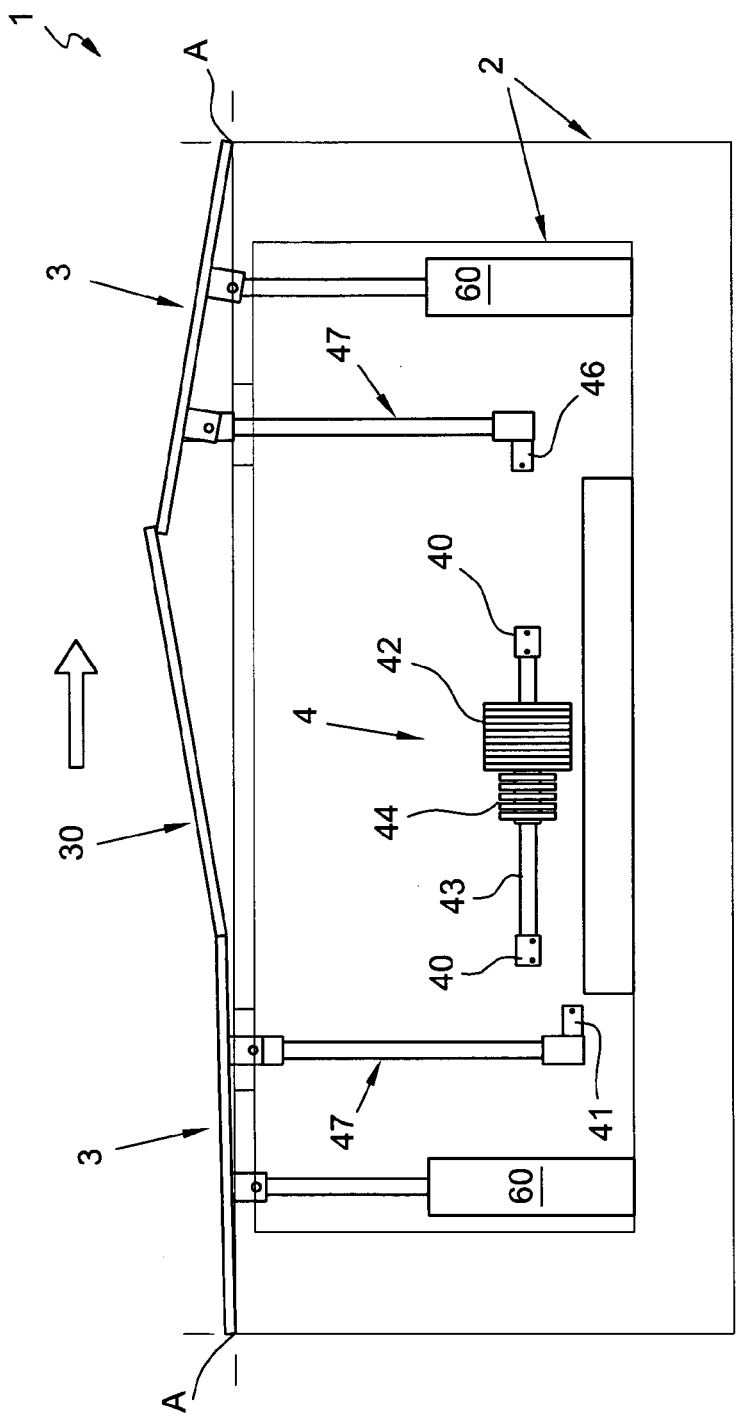
Figure 5:
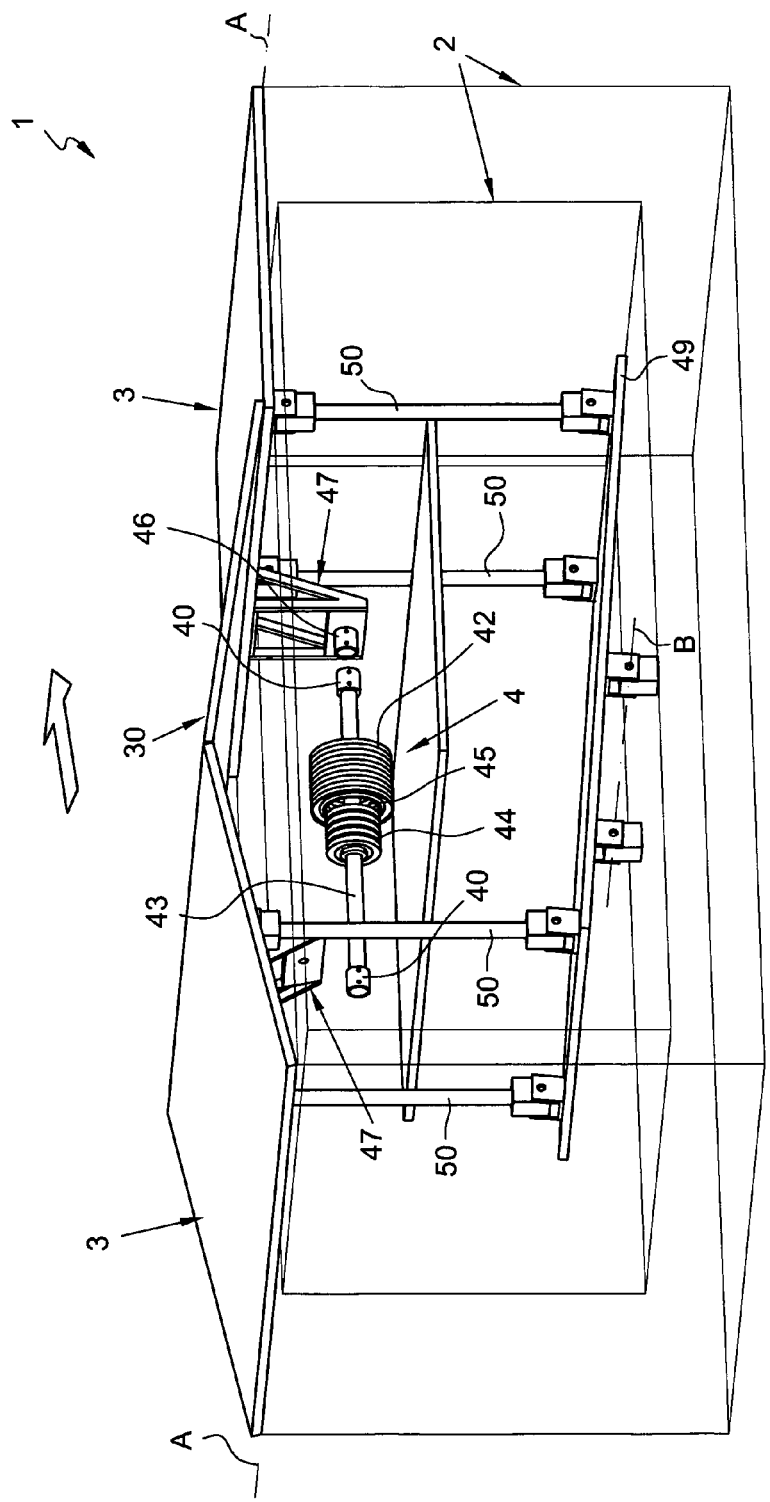
Figure 6:
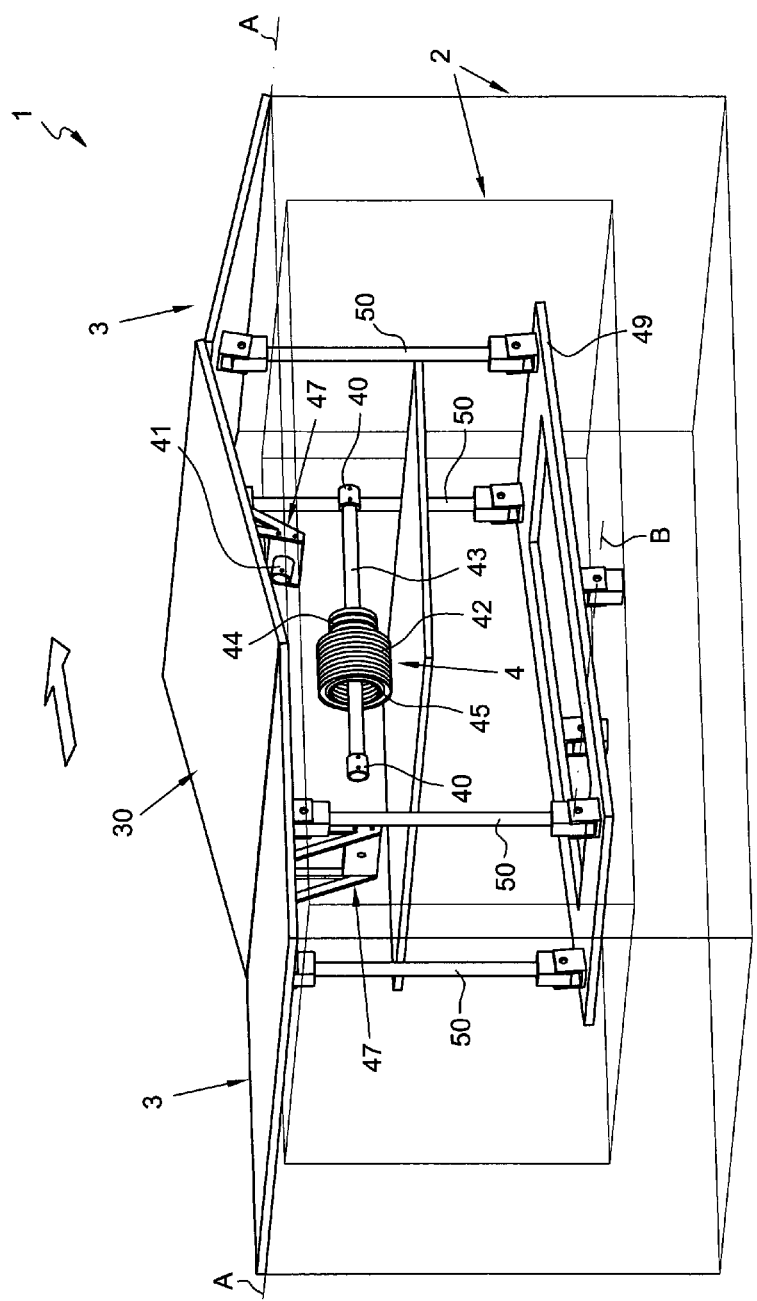
Figure 7:
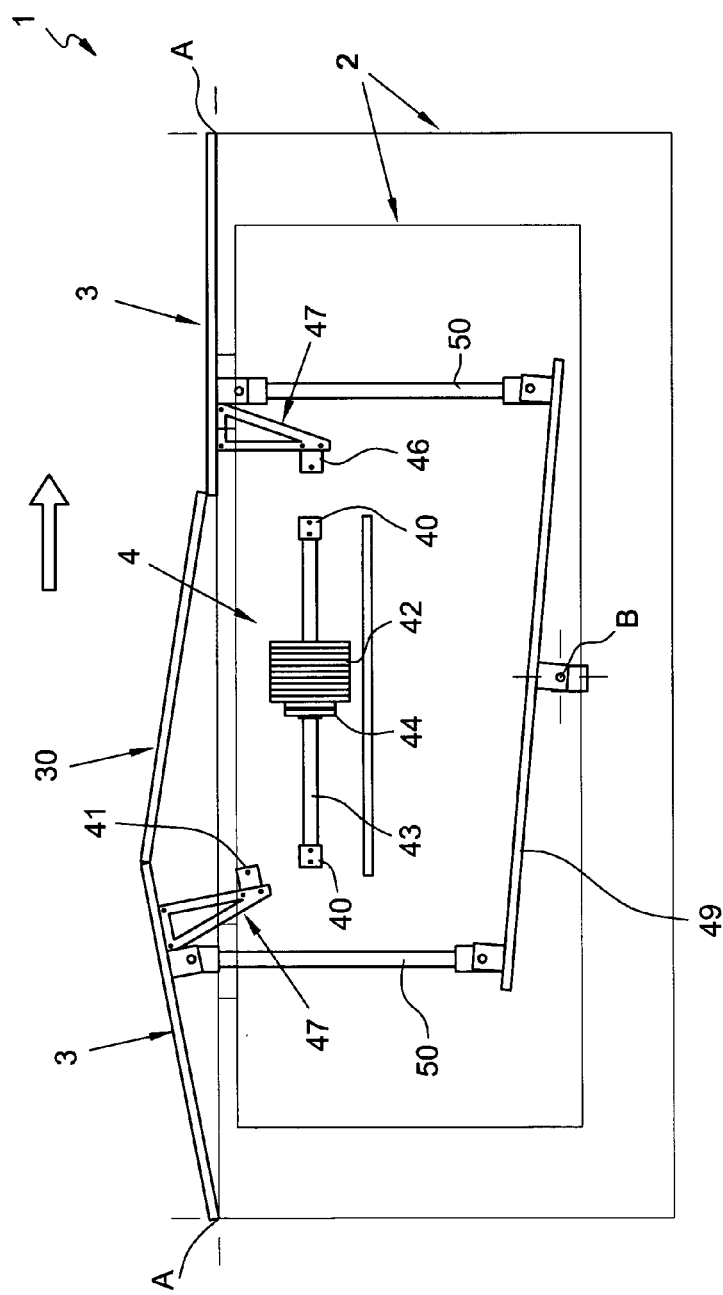
Figure 8:
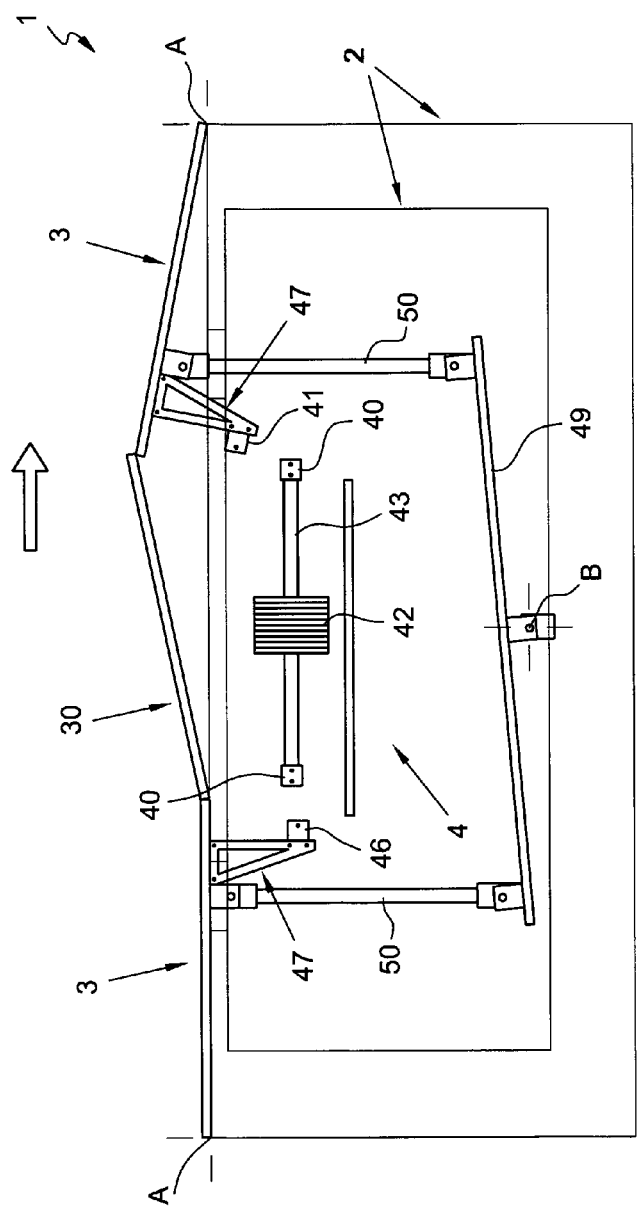
Figure 9:
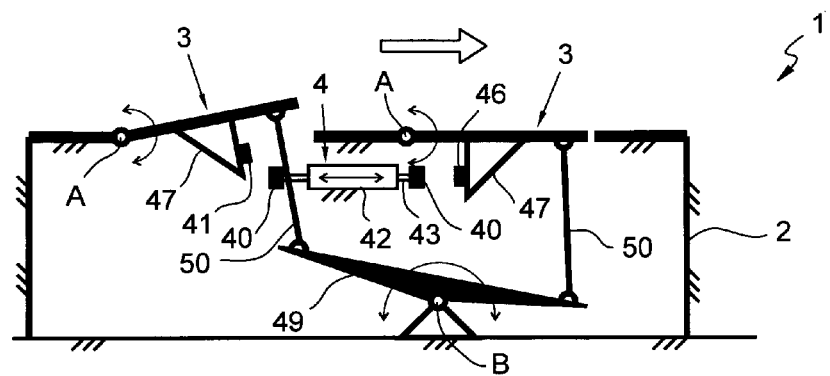
Figure 10:
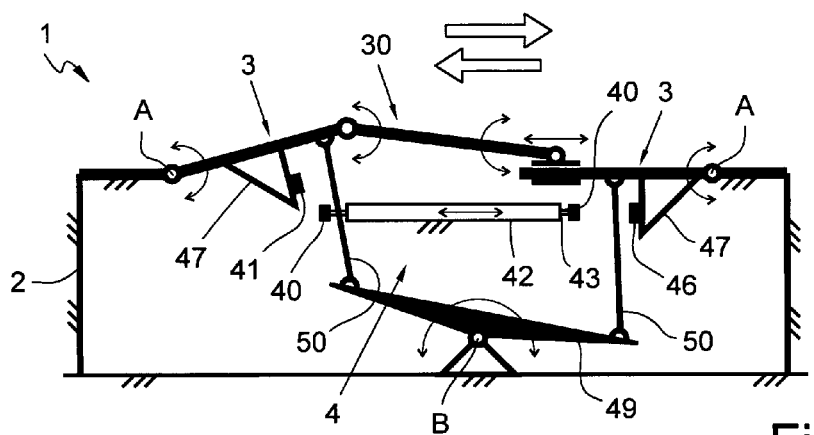
Figure 11:
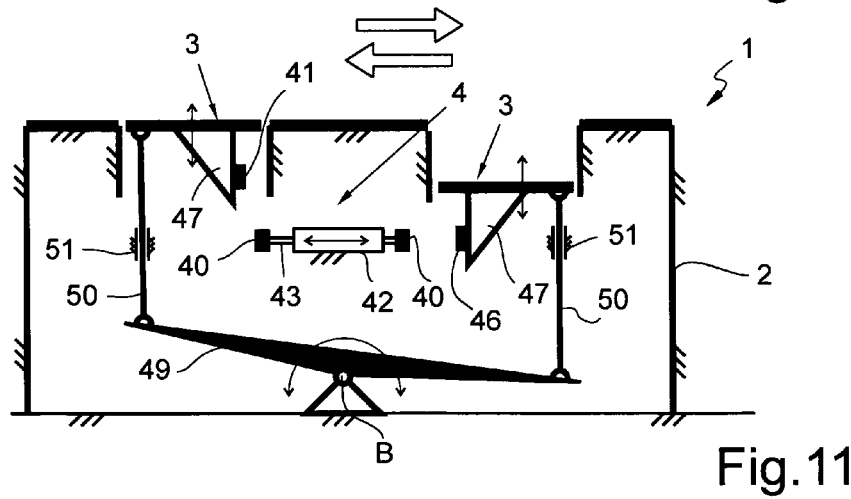
Figure 12:
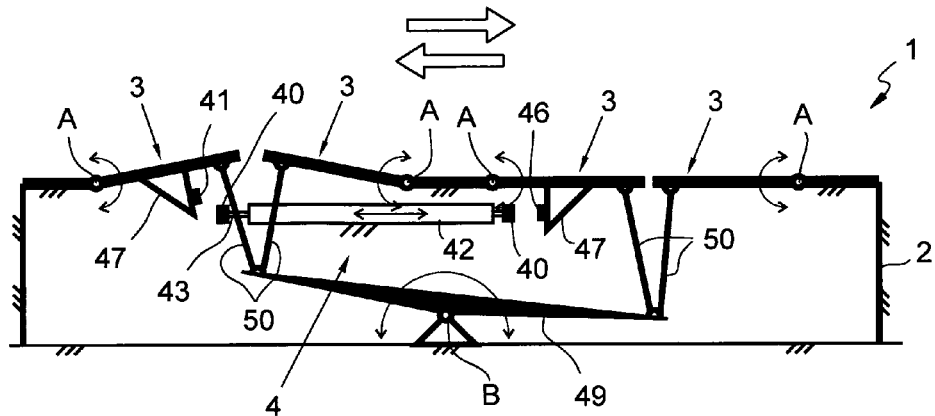
Figure 13:
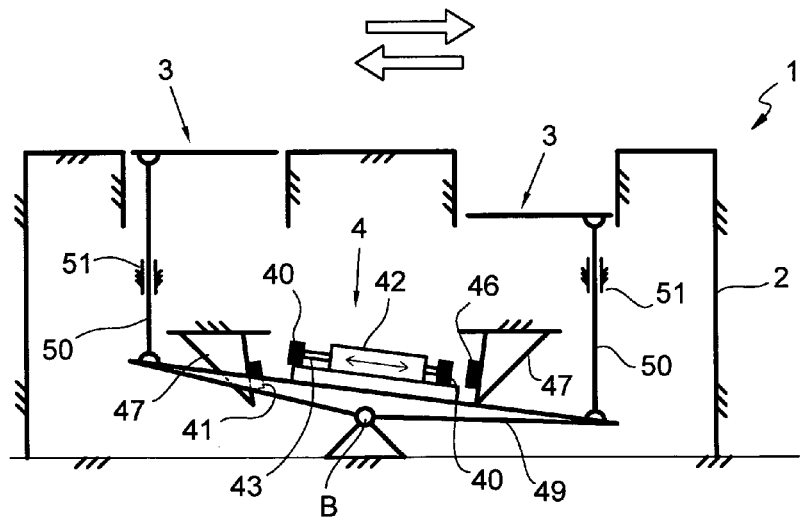

The characteristics and advantages of a system for converting potential and/or kinetic energy of a body weighing upon and/or travelling over a support and/or transit plane into useful energy according to the present invention will become clearer from the following description, given as an example and not for limiting purposes, referring to the attached schematic drawings, in which:

FIGS. 1 and 2 schematically show perspective views of a first embodiment of a conversion system according to the present invention with two footboards and in two successive configurations;

FIGS. 3 and 4 schematically show side views of the conversion system represented in FIGS. 1 and 2, respectively;

FIGS. 5 and 6 schematically show perspective views of a second embodiment of a conversion system according to the present invention with two footboards and in two successive configurations;

FIGS. 7 and 8 schematically show side views of the conversion system represented in FIGS. 5 and 6, respectively;

FIG. 9 schematically shows a side view of a third embodiment of a conversion system according to the present invention with two oscillating footboards having one-directional activation;

FIG. 10 shows the kinematic diagram of the embodiment according to FIGS. 5-8 two oscillating footboards having two-directional activation;

FIG. 11 schematically shows a side view of a fourth embodiment of a conversion system according to the present invention with two translating footboards having two-directional activation;

FIG. 12 schematically shows a side view of a fifth embodiment of a conversion system according to the present invention with four oscillating footboards having two-directional activation;

FIG. 13 schematically shows a side view of a sixth embodiment of a conversion system according to the present invention with two translating footboards having two-directional activation.

With reference to the mentioned figures, a system 1 for converting potential and/or kinetic energy of a body weighing upon and/or travelling over a support and/or transit plane into useful energy is shown.

The system 1 converts the potential and/or kinetic energy associated with a vehicle or with a generic load like, purely as an example, a container, which is loaded onto the support plane of a weighbridge or with a vehicle or pedestrian that travels over a road or pedestrian surface into useful energy.

For the sake of simplicity, in the attached figures and in the present description we refer to a system 1 applied to a road surface and subjected to the passing of vehicles for producing electrical energy, without this constituting a limitation to the present invention.

In the present description, moreover, possible indications of orientation, such as "vertical", and "horizontal" or "upper" and "lower", or of succession of elements or positions, for example with adjectives like "first" and "second" or "initial" and "end", are intended to refer to the condition of application of the system 1, without constituting a limitation to the present invention.

The system 1 comprises a fixed framework 2, only schematically illustrated, with which at least one footboard 3 is associated in a mobile manner, the upper surface of which defines a support and/or transit plane of a body, like for example a vehicle, a container or a pedestrian, not depicted.

The footboard 3 is mobile, through the action of such a body, between an initial position and an end position; there are also return means of the footboard 3 into its initial position when the action exerted upon it by the vehicle or pedestrian ends.

Under the footboard 3 there is a magnetic interaction device 4 that comprises: at least two elements, which are associated with one another in a mobile fashion relative to one another and the mobile element of which is associated with at least one magnet 40, means for counteracting the relative motion of such two elements and at least one magnet 41 for setting the mobile element in motion with respect to the fixed element.

In the embodiments represented in the attached figures the fixed element consists of a cylindrical body 42, which is internally hollow and open at the opposite ends, and the mobile element consists of a shaft 43, which is coaxial to the cylindrical body 42 and is housed, free to move with alternate rectilinear motion and/or in rotation in both directions, inside the cylindrical body 42 with the opposite ends projecting from it. Each of the two opposite ends of the shaft 43 has a respective magnet 40 associated with it. For the sake of simplicity, hereafter we shall refer to the shaft 43 and to the cylindrical body 42 meaning to respectively indicate the mobile element and the fixed element of the magnetic interaction device 4.

The magnetic interaction device 4 takes up a first configuration, in which the activation magnet 41 is outside of the field of interaction with the magnet 40 of the shaft 43, and a second configuration, in which the activation magnet 41 is inside the field of interaction with the magnet 40 of the shaft 43.

According to the present invention, the system 1 comprises means for transmitting the motion of the footboard 3 between the respective initial and final positions either to the activation magnet 41, the combination of the cylindrical body 42 and the shaft 43 being fixed, or to the combination of the cylindrical body 42 and the shaft 43, the activation magnets 41 being fixed, so as to cause the magnetic interaction device 4 to go from the first to the second configuration and/or vice-versa, setting the shaft 43 (mobile element) in motion with respect to the cylindrical body 42 (fixed element), without any contact.

The relative motion of such two elements, shaft 43 and cylindrical body 42, thus makes useful energy available that can be used in the form of variation of a magnetic flux or of pressure of a fluid, liquid or gas.

With particular reference to the embodiments represented in the attached figures, the shaft 43 has further permanent magnets 44 associated with it, whereas inside the cylindrical body 42, electrical windings 45 are arranged, suitably separated by dividing walls. The motion of the shaft 43 with respect to the cylindrical body 42 generates a variation of the magnetic flux linked to the electrical windings 45 inside it and, therefore, by electromagnetic induction, a variation in electric voltage able to be exploited through electrical connection lines, not represented. In fact, the assembly consisting of the shaft 43 and the cylindrical body 42 defines a linear electric generator with permanent magnets.

In an alternative embodiment, not depicted, the shaft 43 can have a piston associated with it that is able to move in a sliding fashion in a chamber defined inside the cylindrical body 42 and provided with inlet and discharge ports of an operating fluid, liquid or gas. In this case the motion of the shaft 43 with respect to the cylindrical body 42 is used to generate a variation in the pressure of such a fluid that can in turn be used.

With particular reference to the embodiments represented in the attached FIGS. 1-10 and 12, the footboard 3 is hinged to the framework 2 around an axis A parallel to the support and/or transit plane; preferably, the axis A is horizontal and perpendicular to the travel direction of a vehicle or a pedestrian on the footboard 3 itself. In this case, the footboard 3 oscillates from an initial position in which it is inclined with respect to the road surface and an end position in which it is substantially aligned with the road surface.

On the other hand, with reference to the embodiments represented in FIGS. 11 and 13, the footboard 3 is guided in a sliding manner parallel to itself along a direction preferably parallel to the weight force exerted on it by the vehicle or by the pedestrian travelling on it; in particular, the footboard 3 translates parallel to itself in the vertical direction.

The return means of the footboard 3 into its initial position, when the action of the body weighing upon and/or travelling over it stops, can be of the elastic, mechanical, pneumatic, hydraulic, electro-mechanical or electromagnetic type, also selectively active and managed by a command and control system according to the signals sent by special sensors capable of detecting, for example, the passing or the weight of a body over the respective footboard.

The means for counteracting the relative motion of the shaft 43 with respect to the cylindrical body 42 can be of the elastic type, like a spring (not depicted), or of the hydraulic, pneumatic or magnetic type. In this last case, they comprise at least one contrast magnet 46 also interacting with a magnet 40 associated with the shaft 43.

The magnet 40 of the shaft 43 and the activation magnet 41 are arranged so as to repel one another, the respective surfaces intended to face one another having the same polarity.

Similarly, the magnet 40 of the shaft 43 and the contrast magnet 46 are arranged so as to repel one another, the respective surfaces intended to face one another having the same polarity.

However, this does not rule out the possibility of the magnet 40 and the activation magnet 41 and the magnet 40 and the contrast magnet 46 being arranged so as to attract one another.

According to the present invention, the cylindrical body 42, i.e. the fixed element of the magnetic interaction device 4, is fixed with respect to the framework 2 and the means for transmitting the motion of the footboard 3 comprise a support 47 of the activation magnet 41 that is fixedly connected to the lower surface of the footboard 3 (FIGS. 1-12).

Alternatively, according to the present invention, the activation magnet 41 is fixed with respect to the framework 2 and the means for transmitting the motion of the footboard 3 are associated with the fixed element, i.e. with the cylindrical body 42, of the magnetic interaction device 4 with which the mobile element, i.e. the shaft 43 also moves as a unit (FIG. 13).

Advantageously, the system 1 comprises at least two footboards 3 in series that alternatively take up the respective initial and end positions and that are associated with a common magnetic interaction device 4 made up of one or more combinations, each consisting of a cylindrical body 42 and the respective shaft 43 that is thus alternately set in motion by one or the other footboard 3.

In the first embodiment represented in FIGS. 1-4, each of the two footboards 3 is hinged, at the respective most outer side, around a respective horizontal axis A and they have the most inner sides articulated from an intermediate plane 30, respectively through hinge and support.

The magnetic interaction device 4 comprises two combinations each consisting of a cylindrical body 42 and a shaft 43 at the opposite ends of which a respective magnet 40 is associated. The two cylindrical bodies 42 are fixed with respect to the framework 2, whereas below each of the two footboards 3 a support 47 carrying a series of magnets for interacting with the magnets 40 facing them is fixedly connected, through a respective hinge, preferably spherical or cylindrical. Such interaction magnets act alternately as activation magnet 41 and as contrast magnet 46.

The return means of each footboard 3 in the respective initial position consist, for each footboard 3, of a pair of cylinder and piston devices 60 for example of the electro-mechanical, hydraulic or pneumatic type. In general, such return means can be of the elastic and/or hydraulic and/or pneumatic and/or magnetic type.

In FIGS. 1 and 3 the first footboard 3, the one farthest to the left, is in its initial position and the second footboard 3, the one farthest to the right, is in the end position, and in such a position the magnets associated with the first footboard 3 acts as contrast magnets 46 and the magnets associated with the second footboard 3 act as activation magnets 41.

From such a position, when a vehicle travels over the plane defined by the two footboards in succession, it causes the downward oscillation of the first footboard 3 whereas the second footboard 3 oscillates upwards. Consequently, the magnets fixedly connected to the first footboard 3 come out from the field of interaction with the respective magnets 40, making it possible for the shaft 43 to move to the left, whereas the magnets associated with the second footboard 3 enter into the field of interaction with the respective magnets 40 and, through repulsion effect, push the shaft 43 to slide to the left (FIGS. 2 and 4). It should be noted that it is preferable for the intermediate plane 30 to not be able to lift with respect to the footboard 3 on the right to which it can be fixedly connected in an analogous way to what is depicted in the diagram of FIG. 10. As the vehicle progressively moves forwards, thanks to the presence of return means consisting for example of the cylinder and piston devices 60, the positions and the action of the two footboards 3 invert with further movement of the shaft 43 in the opposite direction, i.e. to the right and thus into the initial configuration (FIGS. 1 and 3). As already indicated, the return means of each footboard, be they of the electro-magnetic, hydraulic, pneumatic or electro-mechanical type, can be selectively active and managed by a command and control system according to the signals sent by special sensors capable of detecting for example the motion values of a body travelling near to the footboards or the weight of a body on the respective footboard, so that, in the absence of a body weighing upon and/or travelling over the footboards, one is in its initial position and the other is in its end position.

The motion, in both directions, of each shaft 43 relative to the respective cylindrical body 42 causes a variation of the magnetic flux linked to the corresponding windings 45 and, therefore, by electromagnetic induction, a variation of electrical voltage able to be used.

It should be noted that the motion of each footboard 3 is transmitted to the shaft 43 without any direct contact with it and in particular without a mechanical coupling between the footboard and the shaft, such as a gear or an articulated coupling.

In the second embodiment represented in FIGS. 5-8 the two footboards 3 are associated with common return means that comprise a rocker lever 49 that is pivoted about an axis B preferably parallel to the axis A and the opposite ends of which are articulated by means of respective connecting rods 50 to the two footboards 3, respectively. The rocker lever 49, in the absence of a body weighing on or travelling over the two footboards 3, is suitable for keeping one of such two footboards 3 in the respective initial position and the other in the respective end position.

In this case, the magnetic interaction device 4 comprises a single cylindrical body 42 with which a shaft 43 is associated and that is fixed with respect to the framework 2.

Under each footboard 3 a respective support 47 is fixed that carries a respective magnet, which alternately acts as activation magnet 41 and as contrast magnet 46. The operation is analogous to the previous case.

In the embodiment represented in FIG. 13, the two footboards 3 are associated with the framework 2 in a mobile fashion, parallel to themselves, preferably in a vertical direction.

Also in such an embodiment the two footboards 3 are associated with common return means that comprise a rocker lever 49 that is pivoted about a preferably horizontal axis B and the opposite ends of which are articulated by means of respective connecting rods 50 to the two footboards 3, respectively. Preferably, each connecting rod 50 is then guided inside a respective sleeve 51.

In such an embodiment, the fixed element, i.e. the cylindrical body 42 of the magnetic interaction device 4 is fixedly connected to the rocker lever 49 and two magnets for interacting with the magnets 40 of the mobile element, i.e. the shaft 43, are associated in a fixed manner with respect to the framework 2.

Also in this case the two interaction magnets alternately act as activation magnet 41 and as contrast magnet 46.

In such an embodiment the return means, i.e. the rocker lever 49 and the respective connecting rods 50, act as means for transmitting the motion from the footboards 3 to the assembly consisting the cylindrical body 42 and the shaft 43.

The number of footboards 3, their arrangement and their articulation to the framework 2 can be different according, for example, to the type of application, as a weighbridge or as a road surface, to the direction of vehicle or pedestrian travel, and to the arrangement in certain urban areas.

As an example FIGS. 9-12 represent some possible different solutions that can be easily understood by the man skilled in the art.

In the embodiment of FIG. 9, a one-directional activation system is represented in which there are two footboards 3 each articulated oscillating about a respective axis A with respect to the framework 2.

In the embodiment of FIG. 10, a two-directional activation system is represented in which there are two footboards 3 oscillating and articulated together to define an open quadrilateral. Such a solution corresponds to that of FIGS. 5-8.

In the embodiment of FIG. 12, a two-directional activation system is represented in which there are two footboards 3 each divided into two segments oscillating in opposite directions and associated with the rocker lever 49 by respective connecting rods 50.

In the embodiment of FIG. 11, a two-directional activation system is represented in which there are two footboards 3 translating in a preferably vertical direction. Alternatively, the footboards 3 can translate along a direction inclined with respect to the plane defined by them, for example in order to use a fraction of energy of the motion component.

In light of the attached figures and the present description the operation of the conversion system according to the present finding can be easily understood by the man skilled in the art.

The conversion system thus conceived can undergo numerous modifications and variants, all of which are covered by the invention; moreover, all of the details can be replaced with technically equivalent elements. In practice, the materials used, as well as the sizes, can be whatever according to the technical requirements.

For example, with regard to the magnetic interaction device, the fixed element and the mobile element can have a different shape and configuration, the fixed element can consist of the shaft and the mobile element can consist of the hollow cylindrical body, the shaft can project from the hollow cylindrical body at just one end or be completely contained inside it, in this case being associated with external activation members, or furthermore the magnets associated with the mobile element can be arranged differently.

Similarly, the initial and end positions of the mobile footboards, the configuration, the number, the arrangement and the articulation of the footboards can vary according to the application and the arrangement of the system according to the present invention. For example, in the initial or end position, the footboards can project above or below the plane to which they are applied, or else, the articulation that describes the kinematics of the footboards can be such as to allow them to both rotate and translate.

The invention claimed is:

1. System (1) for converting potential or kinetic energy of a body weighing upon or travelling over a support or transit plane into useful energy comprising:
    a fixed framework (2) with which at least one footboard (3) is associated in a mobile manner defining said support or transit plane and that is mobile, by the action of said body, between an initial position and an end position, characterised in that it comprises:
        a magnetic interaction device (4) comprising at least a fixed element (42) and a mobile element (43) that are associated with one another in a mobile manner relative to one another, said mobile element (43) of which is associated with at least one magnet (40);
    means for counteracting the relative motion of said fixed element (42) and said mobile element (43) and at least one activation magnet (41), associated with said at least one footboard (3) or with said fixed framework (2), for setting said mobile element (43) in motion with respect to said fixed element (42), wherein said magnetic interaction device takes up a first configuration in which said activation magnet (41) is outside of the field of interaction with the said at least one magnet (40) of said mobile element (43) and a second configuration in which said activation magnet (41) is inside the field of interaction with said at least one magnet (40) of said mobile element (43); and
    means for transmitting the motion of said footboard (3) between said initial position and said end position to one from said activation magnet (41) and the combination of said fixed element (42) and said mobile element (43) for the passage of said magnetic interaction device (4) from said first configuration to said second configuration, vice-versa, setting said mobile element (43) in motion with respect to the fixed element (42) without any contact, wherein the relative motion of said fixed element (42) and said mobile element (43) makes useful energy available that can be used in the form of variation of a magnetic flux.

2. System (1) according to claim 1, characterised in that said footboard (3) is hinged to said fixed framework (2) around an axis (A) coplanar to said support or transit plane or it is slidingly guided parallel to itself along a direction incident to itself.

3. System (1) according to claim 2, characterised in that it comprises return means of said footboard (3) for returning said footboard (3) to its initial position when the action exerted on it by said body ceases.

4. System (1) according to claim 1, characterised in that said fixed element (42) of said magnetic interaction device (4) is fixed with respect to said framework (2) and in that said transmission means comprise a support (47) of said activation magnet (41) that is constrained to said footboard (3).

5. System (1) according to claim 1, characterised in that said activation magnet (41) is fixed with respect to said framework (2) and in that said means for transmitting are associated with said fixed element (42) of said magnetic interaction device (4).

6. System (1) according to claim 1, characterised in that said counteracting means are of the elastic type, hydraulic type or pneumatic type.

7. System (1) according to claim 1, characterised in that said counteraction means comprise a contrast magnet (46) suitable for interacting with said at least one magnet (40) associated with said mobile element (43).

8. System (1) according to claim 1, characterised in that said at least one magnet (40) of said mobile element (43) and said activation magnet (41) are arranged so as to repel or attract one another, the respective surfaces intended to face one another having the same polarity or opposite polarity.

9. System (1) according to claim 7, characterised in that said at least one magnet (40) of said mobile element (43) and said contrast magnet (46) are arranged so as to repel or attract one another, the wherein said at least one magnet (40) and said contrast magnet (46) have respective surfaces intended to face one another and said respective surfaces have the same polarity or opposite polarity.

10. System (1) according to claim 3, characterised in that said system (1) comprises at least two of said footboards (3) arranged alternately in series in respective initial and end positions.

11. System (1) according to claim 10, characterised in that said fixed element (42) of said magnetic interaction device is fixed with respect to said framework (2) and in that each of said two footboards (3) has a support (47) of a respective magnet for interaction with said at least one magnet (40) of said mobile element (43) constrained to said footboards (3) and said at least one magnet (40 of said mobile element (43), said interaction magnets alternately acting as activation magnet (41) and as means (46) for counteracting the motion of said mobile element (43).

12. System (1) according to claim 3, characterised in that said return means are of the magnetic, electro-magnetic, hydraulic, pneumatic or electro-mechanical type, selectively active in function of signals sent by sensors for detecting said body for keeping each of said footboards (3) in the respective initial or final position.

13. System (1) according to claim 10, characterised in that said return means comprise a rocker lever (49) that is pivoted about an axis (B) parallel to said support (47) or transit plane where opposite ends of said rocker lever (49) are articulated by means of respective connecting rods (50) that are respectively attached to said two footboards (3), wherein said rocker lever (49) is suitable for keeping one of said two footboards (3) in a respective initial position and another of said two footboards (3) in a respective end position, in the absence of said body.

14. System (1) according to claim 13, characterised in that the fixed element (42) of said magnetic interaction device (4) is fixed with respect to said framework (2) and in that said transmission means comprise, for each of said two footboards, a support (47) of a respective magnet for interaction with the magnet (40) of said mobile element (43), wherein said support (47) is constrained to a corresponding footboard and a respective interaction magnet alternately acts as activation magnet (41) and as means for counteracting the motion of said mobile element (43).

15. System (1) according to claim 13, characterised in that the fixed element (42) of said magnetic interaction device (4) is fixed with respect to said framework (2) and in that said transmission means comprise, for each of said two footboards, a support (47) of a respective magnet for interaction with the magnet (40) of said mobile element (43), wherein said support (47) is constrained to a corresponding footboard and the respective interaction magnet alternately acts as activation magnet (41) and as means for counteracting the motion of said mobile element (43).

16. System (1) according to claim 1, characterised in that said fixed element (42) is associated with electrical windings (45) and said mobile element is provided with at least one permanent magnet (44) suitable for interacting with said electrical windings, the relative motion of said fixed element (42) and a mobile element (43) generating a variation in the magnetic flux linked to said electrical windings and, by electromagnetic induction, a variation in the electrical voltage.

17. System (1) according to claim 1, characterised in that one of said a fixed element (42) and a mobile element (43) consists of an internally hollow cylindrical body and the other of said fixed element (42) and a mobile element (43) consists of a shaft coaxial to said cylindrical body, said cylindrical body and said shaft being mobile with respect to one another in translation or rotation.

18. System (1) according to claim 17, characterised in that a piston able to slide in a chamber defined in said cylindrical body is associated with said shaft, and said cylindrical body is provided with an inlet port and an outlet port for an operating fluid, with relative motion of said fixed element (42) and a mobile element (43) generating a variation in pressure of said fluid.

* * * * *